(12) United States Patent
Kikkawa et al.

(10) Patent No.: US 12,487,127 B2
(45) Date of Patent: Dec. 2, 2025

(54) MANAGEMENT SYSTEM, MANAGEMENT DEVICE, MANAGEMENT METHOD, AND NON-TRANSITORY COMPUTER READABLE MEDIA

(71) Applicant: KURITA WATER INDUSTRIES LTD., Tokyo (JP)

(72) Inventors: Takashi Kikkawa, Tokyo (JP); Naoki Ikegawa, Tokyo (JP); Takuji Kurino, Tokyo (JP); Koh Takanose, Tokyo (JP); Daisuke Taka, Tokyo (JP); Emi Kaiya, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 382 days.

(21) Appl. No.: 18/019,240

(22) PCT Filed: Jul. 16, 2021

(86) PCT No.: PCT/JP2021/026817
§ 371 (c)(1),
(2) Date: Feb. 1, 2023

(87) PCT Pub. No.: WO2022/030229
PCT Pub. Date: Feb. 10, 2022

(65) Prior Publication Data
US 2024/0053205 A1    Feb. 15, 2024

(30) Foreign Application Priority Data
Aug. 3, 2020    (JP) .................. 2020-131549

(51) Int. Cl.
*G01J 5/48*  (2022.01)
*B65G 3/02*  (2006.01)
*G01J 5/00*  (2022.01)

(52) U.S. Cl.
CPC .............. *G01J 5/485* (2022.01); *B65G 3/02* (2013.01); *G01J 2005/0077* (2013.01)

(58) Field of Classification Search
CPC ...... G01J 5/485; G01J 2005/0077; B65G 3/02
See application file for complete search history.

(56) References Cited

U.S. PATENT DOCUMENTS

| 7,034,300 B2* | 4/2006 | Hamrelius | ........... H04N 23/671 |
|---|---|---|---|
| | | | 348/E5.029 |
| 2011/0186657 A1* | 8/2011 | Haviland | .............. F41B 9/0087 |
| | | | 239/722 |

(Continued)

FOREIGN PATENT DOCUMENTS

| CN | 103559497 | 2/2014 |
|---|---|---|
| CN | 103605987 | 2/2014 |

(Continued)

OTHER PUBLICATIONS

Cao et al., Temperature inspection system for open-air coal yard based on UAVs, 2016 13th International Conference on Ubiquitous Robots and Ambient Intelligence (URAI), School of Mechanical Engineering, Xi' an University of Science and Technology, Xi' an, 710054, China (Year: 2016).*
"Search Report of Europe Counterpart Application", issued on Dec. 14, 2023, pp. 1-9.
Wikipedia, "Thermography", retrieved on Nov. 29, 2023, https://en.wikipedia.org/w/index.php?title=Thermography&01did=767297058.

(Continued)

*Primary Examiner* — Hugh Maupin
(74) *Attorney, Agent, or Firm* — JCIPRNET (57) ABSTRACT

The invention provides a management system of coal and/or steelmaking dust being managed outdoors. The management system includes an imaging unit, a threshold information acquiring unit, and a determining unit. The imaging unit is configured to perform imaging of heat distribution image information indicating a heat distribution image of a surface layer of a pile of the coal and/or steelmaking dust from a position where imaging of an entire surface layer of the pile can be performed. The threshold information acquiring unit (Continued)

is configured to acquire threshold information indicating a threshold of a temperature of the surface layer of the pile. The determining unit is configured to determine heat generation of the pile based on the heat distribution image information and the threshold information.

7 Claims, 3 Drawing Sheets

(56) References Cited

U.S. PATENT DOCUMENTS

| | | | |
|---|---|---|---|
| 2015/0094953 A1* | 4/2015 | Montgomery | G06V 20/20 701/408 |
| 2021/0064848 A1* | 3/2021 | Jagyasi | G01W 1/06 |

FOREIGN PATENT DOCUMENTS

| | | |
|---|---|---|
| CN | 102798470 | 4/2015 |
| CN | 108033015 | 5/2018 |
| CN | 108201667 | 6/2018 |
| CN | 108536071 | 9/2018 |
| CN | 107843939 | 3/2020 |
| JP | H03153829 | 7/1991 |
| JP | H108285693 | 11/1996 |
| JP | 2016078999 | 5/2016 |
| JP | 2017096789 | 6/2017 |
| JP | 2019032165 | 2/2019 |
| JP | 2021076519 | 5/2021 |
| KR | 101832454 | 4/2018 |
| KR | 101880099 | 7/2018 |
| KR | 1020180135827 | 12/2018 |
| WO | 2017199273 | 11/2017 |

OTHER PUBLICATIONS

Office Action of Australian Counterpart Application, issued on Feb. 27, 2024, pp. 1-8.

V. Fierro et al., "Prevention of spontaneous combustion in coal stockpiles Experimental results in coal storage yard", Fuel Processing Technology, May 1999, pp. 23-34.

"Office Action of Europe Counterpart Application", issued on Sep. 4, 2024, pp. 1-10.

"Office Action of Taiwan Counterpart Application", issued on Aug. 5, 2024, with English translation thereof, p. 1-p. 25.

Office Action of Japan Counterpart Application, with English translation thereof, issued on Oct. 12, 2021, pp. 1-8.

Office Action of Japan Counterpart Application, with English translation thereof, issued on Apr. 19, 2022, pp. 1-8.

Office Action of Japan Counterpart Application, with English translation thereof, issued on Sep. 13, 2022, pp. 11-16.

"International Search Report (Form PCT/ISA/210) of PCT/JP2021/026817," mailed on Oct. 12, 2021, with English translation thereof, pp. 1-4.

Drone Rice, "NDVI & Temperature Observation", Aug. 7, 2017, with English translation thereof, Available at: https://Web.archive.org/web/20200205 I65827/https://dronerice.jp/2017/08/07/%E7%86%B1%E8%B5%A4%E5%A4%96%E8%A6%B3%E6%B8%AC.

L L Sloss, "Assessing and managing spontaneous combusition of coal", IEA Clean Coal Centre, Oct. 2015, pp. 1-55.

"Office Action of Europe Counterpart Application", issued on Feb. 18, 2025, pp. 1-10.

"Office Action of Korea Counterpart Application", issued on Sep. 18, 2025, with English translation thereof, p. 1-p. 10.

* cited by examiner

MANAGEMENT SYSTEM, MANAGEMENT DEVICE, MANAGEMENT METHOD, AND NON-TRANSITORY COMPUTER READABLE MEDIA

CROSS-REFERENCE TO RELATED APPLICATION

This application is a 371 application of the International PCT application serial no. PCT/JP2021/026817, filed on Jul. 16, 2021, which claims the priority benefit of Japan application no. 2020-131549, filed on Aug. 3, 2020. The entirety of each of the above mentioned patent applications is hereby incorporated by reference herein and made a part of this specification.

TECHNICAL FIELD

The present invention relates to a management system, a management device (apparatus), a management method, and a management program.

BACKGROUND

Coal, used as a steelmaking raw material at ironworks and as a fuel for power generation at electric power plants, is stored in yards in a state of piles. Coal is oxidized by oxygen in the air and generates heat. This oxidation reaction is accelerated as temperature rises and, eventually, there is a risk of ignition.

In order to prevent ignition from such a coal pile, in conventional coal pile management, a thermocouple or the like is inserted into the pile to measure a temperature and, when the temperature is high, water is sprayed on the pile to cool the pile.

In addition, PTL1 discloses a method of providing an infrared thermometer on a mobile water sprayer, measuring a temperature of a surface layer of a coal pile while scanning the surface layer, and spraying water with the water sprayer at a location where a value of the infrared thermometer exceeds a threshold.

CITATION LIST

Patent Literature

PTL1: JPH 03-153829 A

SUMMARY OF INVENTION

Technical Problem

With the method using a thermocouple, upon installing a coal pile, a worker must climb the coal pile and insert the thermocouple which is usually about 2 m long into the coal pile and, when discharging coal, the thermocouple must be retrieved. In addition, when actually measuring a temperature of the coal pile, a temperature display board must be carried out to site and connected to the thermocouple to measure the temperature. Furthermore, only partial temperatures can be assessed by the thermocouple. Generation of heat by a coal pile may sometimes occur by change in a narrow range of locations where there is equilibrium between supply of oxygen and heat storage. When heat generation occurs in a narrow range in this manner, the heat generation cannot be detected if a thermocouple is not available in a vicinity of the range. Although the thermocouple may be provided in plurality, it is difficult to detect occurrences of heat generation without omission and work for insertion and retrieval described above increases.

In addition, with the method described in PTL1, while an overall image of heat generation can be obtained by scanning an entire coal pile, it is impossible to comprehend heat generation of the entire coal pile in a short amount of time.

Such heat generation can also occur in steelmaking dust including iron sulfide.

In view of the circumstances described above, an object of the present invention is to provide a management system, a management apparatus, a management method, and a management program capable of readily determining a heat distribution of a pile of coal and/or steelmaking dust.

Solution to Problem

An aspect of the present invention provides a management system of coal and/or steelmaking dust being managed outdoors. The management system includes an imaging unit, a threshold information acquiring unit, and a determining unit. The imaging unit is configured to perform imaging of heat distribution image information indicating a heat distribution image of a surface layer of a pile of the coal and/or steelmaking dust from a position where imaging of an entire surface layer of the pile can be performed. The threshold information acquiring unit is configured to acquire threshold information indicating a threshold of a temperature of the surface layer of the pile. The determining unit is configured to determine heat generation of the pile based on the heat distribution image information and the threshold information.

Specifically, each of the aspects described below may be provided.

The management system described above, further including an output unit, wherein the output unit is configured to display, for each pile, a determination result of heat generation of the pile by the determining unit.

The management system described above, wherein the imaging unit is a flying object including a heat distribution meter.

The management system described above, further including a water spraying unit, wherein the determining unit is configured to determine a necessity of water spraying for each pile based on a result of determination of heat generation of the pile, and the water spraying unit is configured to spray water based on a result of determination of a necessity of water spraying by the determining unit.

A management apparatus of coal and/or steelmaking dust being managed outdoors, the management apparatus including a heat distribution image information acquiring unit, a threshold information acquiring unit, and a determining unit, wherein the heat distribution image information acquiring unit is configured to acquire heat distribution image information which indicates a heat distribution image of a surface layer of a pile of the coal and/or steelmaking dust and of which imaging has been performed from a position where imaging of an entire surface layer of the pile can be performed, the threshold information acquiring unit is configured to acquire threshold information indicating a threshold of a temperature of the surface layer of the pile, and the determining unit is configured to determine heat generation of the pile based on the heat distribution image information and the threshold information.

A management method of coal and/or steelmaking dust being managed outdoors, the management method including an imaging step, a threshold information acquisition step, and a determination step, wherein the imaging step involves performing imaging of heat distribution image information indicating a heat distribution image of a surface layer of a pile of the coal and/or steelmaking dust from a position where imaging of an entirety of the pile can be performed, the threshold information acquisition step involves acquiring threshold information indicating a threshold of a temperature of the surface layer of the pile, and the determination step involves determining heat generation of the pile based on the heat distribution image information and the threshold information.

A management program of coal and/or steelmaking dust being managed outdoors, the management program causing a computer to function as a heat distribution image information acquiring unit, a threshold information acquiring unit, and a determining unit, wherein the heat distribution image information acquiring unit is configured to acquire heat distribution image information indicating a heat distribution image of a surface layer of a pile of the coal and/or steelmaking dust from a position where imaging of an entire surface layer of the pile can be performed, the threshold information acquiring unit is configured to acquire threshold information indicating a threshold of a temperature of the surface layer of the pile, and the determining unit is configured to determine heat generation of the pile based on the heat distribution image information and the threshold information.

It is needless to say that the present invention is not limited to the above.

According to the present invention, a heat distribution of a pile of coal and/or steelmaking dust can be readily determined.

DESCRIPTION OF EMBODIMENTS

Hereinafter, an embodiment of the present invention will be described with reference to the drawings. Various feature items shown in the embodiment described below can be combined with each other.

Note that a program for realizing software described in the present embodiment may be provided as a computer-readable non-transitory recording medium, provided so as to be downloadable from an external server, or provided so as to be run on an external computer such that functions thereof are realized on a client terminal (so-called cloud computing).

In addition, a "unit" as referred to in the present embodiment may include, for example, a combination of hardware resources implemented by a circuit in a broad sense and information processing by software which may be specifically implemented by such hardware resources. Furthermore, while various kinds of information are handled in the present embodiment, for example, such information are to be represented by a physical value of a signal value representing a voltage or a current, a level of a signal value as an aggregate of binary bits constituted of 0 or 1, or a quantum superposition (a so-called quantum bit), and communication and calculations can be executed on the circuit in a broad sense.

Moreover, the circuit in a broad sense is a circuit which is realized by at least appropriately combining a circuit, circuitry, a processor, a memory, and the like. In other words, a circuit in a broad sense includes an application specific integrated circuit (ASIC), a programmable logic device (for example, a simple programmable logic device (SPLD), a complex programmable logic device (CPLD), or a field programmable gate array (FPGA)), and the like.

<Management System>

A management system according to the present embodiment is a management system of coal and/or steelmaking dust to be managed outdoors. Specifically, the management system includes an imaging unit, a threshold information acquiring unit, and a determining unit. The imaging unit is configured to perform imaging of heat distribution image information indicating a heat distribution image of a surface layer of a pile of the coal and/or steelmaking dust from a position where imaging of an entire surface layer of the pile can be performed. In addition, the threshold information acquiring unit is configured to acquire threshold information indicating a threshold of a temperature of the surface layer of the pile. Furthermore, the determining unit is configured to determine heat generation of the pile based on the heat distribution image information and the threshold information.

In addition, although not essential components, the management system according to the present embodiment may include one or two or more of a heat distribution image information acquiring unit, a weather information acquiring unit, a moisture content information acquiring unit, an output unit, a water spraying unit, a pile breakdown unit, and a pile discharging unit. A management system including all of these units will be mainly described with reference to FIG. 1 to be described below.

[Functional Configuration of Management System]

Figure 1:
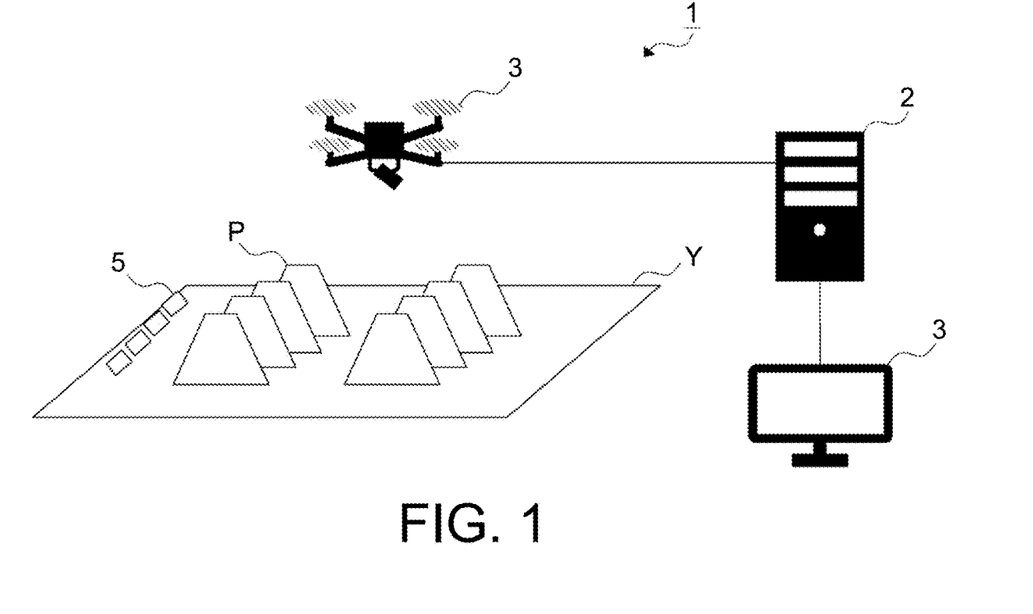
FIG. 1 is a schematic view showing a management system according to a present embodiment.

FIG. 1 is a schematic view showing a management system according to the present embodiment. A management system 1 includes a management apparatus 2, an imaging apparatus 3, an output apparatus 4, and a water spraying apparatus 5.

Figure 2:
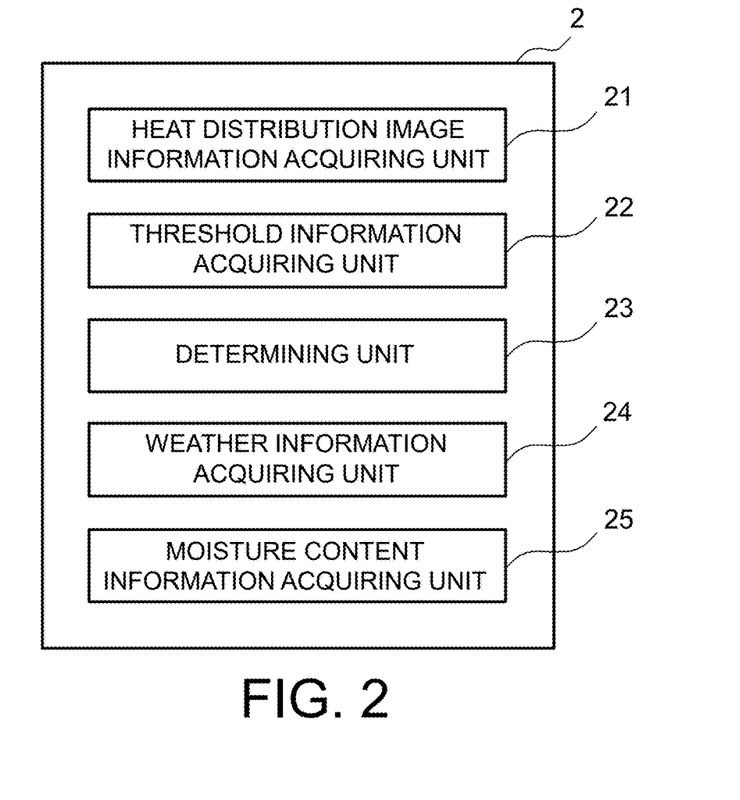
FIG. 2 is a schematic view showing a functional configuration of a management apparatus according to the present embodiment.

Among these components, the management apparatus 2 controls information processing for managing coal and/or steelmaking dust in the management system 1. FIG. 2 is a schematic diagram showing a functional configuration of the management apparatus according to the present embodiment. As shown in FIG. 2, the management apparatus 2 according to the present embodiment mainly includes a heat distribution image information acquiring unit 21, a threshold information acquiring unit 22, and a determining unit 23. In addition, the management apparatus 2 includes a weather information acquiring unit 24 and a moisture content information acquiring unit 25. Note that the imaging apparatus 3 is an example of the imaging unit, the output apparatus 4 is an example of the output unit, the water spraying apparatus 5 is an example of the water spraying unit, and a description will be hereinafter given without particularly distinguishing between the apparatuses and the units.

[Functions of Management System]

Hereinafter, a function of each unit of the management system 1 will be described in specific terms.

[Heat Distribution Image Information Acquiring Unit]

The heat distribution image information acquiring unit 21 is configured to acquire heat distribution image information which indicates a heat distribution image of a surface layer of a pile P of coal and/or steelmaking dust and of which imaging has been performed from a position where imaging of an entire surface layer of the pile P can be performed.

In other words, the heat distribution image information acquired by the heat distribution image information acquiring unit 21 is a heat distribution image capable of overlooking heat distribution information of the entire pile P. In the heat distribution image, there is no difference in measurement time among any of the locations of the pile P. In other words, for example, there is no difference in measurement time such as measuring a given location of the pile P at 14:00 while measuring another location of the pile P at 14:05. However, a time width may be provided depending on specifications of a sensor or the like included in an imaging unit to be described later. For example, while a heat distribution image obtained during two minutes from 14:00 to 14:02 may be used, in this case, the heat distribution image obtained during the two minutes from 14:00 to 14:02 is to be used at any of the locations of the pile P.

While a plurality of piles P may exist in the yard Y, in this case, the heat distribution image information may be a single image showing a heat distribution of only one pile, an image showing a heat distribution of an arbitrary plurality of piles (for example, piles in a certain range in the yard), or an image showing a heat distribution of all of the piles P in the yard Y. When using images other than an image showing a heat distribution of all of the piles P in the yard Y, from a viewpoint of comparing heat generation of piles P, preferably, there is no significant time interval among imaging times of the respective images.

In addition, the heat distribution image information is not particularly limited as long as the information represents a plan view of a pile P as viewed from above and includes a temperature of each location of a surface layer of the pile such as a temperature with thermography.

[Threshold Information Acquiring Unit]

The threshold information acquiring unit 22 is configured to acquire threshold information indicating a threshold of a temperature of the surface layer of the pile P.

The threshold of a temperature is a threshold to become a criterion at which a level of heat generation increases when a temperature equals or exceeds the threshold. The threshold of a temperature may be provided in singularity or in plurality. A specific example thereof will be described later.

Since the threshold of a temperature may also differ depending on a moisture content contained in coal and/or steelmaking dust, a temperature, humidity, a location where the coal and/or steelmaking dust is installed, and the like, the threshold of a temperature may be set in consideration of such factors. The threshold may or may not be changed depending on seasons or meteorological phenomena.

The threshold need not be a threshold which inevitably causes heat generation to occur when a value thereof is exceeded and may be a threshold which causes an occurrence or an increase of a certain level of possibility when a value thereof is exceeded. In addition, the threshold may be a threshold which takes a safety coefficient into consideration.

[Determining Unit]

The determining unit 23 is configured to determine heat generation of the pile P based on the heat distribution image information and the threshold information.

For example, the determining unit 23 is capable of estimating, from at least heat distribution image information, a temperature of each location inside the pile P from a temperature of the surface layer of the pile P and then determining whether or not the estimated temperature exceeds a threshold of a temperature set in advance or whether or not the estimated temperature equals or exceeds the threshold of a temperature set in advance. When estimating the temperature of the inside of the pile P, the temperature is estimated further based on a three-dimensional shape (details will be provided later) or the like of the pile. More specifically, examples of a method of estimation include a thermal analysis based on a three-dimensional shape and a surface temperature of a pile. Alternatively, the determining unit 23 is capable of determining whether or not a temperature of a surface layer at each location of the pile P exceeds a threshold set in advance or whether or not the temperature equals or exceeds the threshold set in advance. For example, when the threshold is set to only 50° C., a determination of "safe" may be made with respect to a location at which a temperature lower than 50° C. is detected and a determination of "danger" may be made with respect to a location at which a temperature equal to or higher than 50° C. is detected. In addition, when the threshold is set to 40° C. and 50° C., a determination of "safe" may be made with respect to a location at which a temperature lower than 40° C. is detected, a determination of "caution" may be made with respect to a location at which a temperature equal to or higher than 40° C. and lower than 50° C. is detected, and a determination of "danger" may be made with respect to a location at which a temperature equal to or higher than 50° C. is detected.

The determining unit 23 may determine whether or not a highest temperature of the pile P exceeds a threshold of a temperature or whether or not the highest temperature equals or exceeds the threshold. For example, when the threshold is set to only 50° C., a determination of "safe" may be made with respect to a pile P in which temperatures of all locations of a surface layer of the pile P are lower than 50° C. and a determination of "danger" may be made with respect to a pile P having a location where the temperature is equal to or higher than 50° C. In addition, when the threshold is set to 40° C. and 50° C., a determination of "safe" may be made with respect to a pile P in which temperatures of all locations of a surface layer of the pile P are lower than 40° C., a determination of "caution" may be made with respect to a pile P in which a temperature of a location of a surface layer of the pile P is equal to or higher than 40° C. but temperatures of all locations of the surface layer of the pile P are lower than 50° C., and a determination of "danger" may be made with respect to a pile P having a location where the temperature is equal to or higher than 50° C.

In addition, when a plurality of piles P are installed in the yard Y, the determining unit 23 may determine a priority of responses (for example, a ranking) for each pile P based on a highest temperature of the pile P, an area in the pile which exceeds a threshold temperature, or the like.

The determining unit 23 may determine how to respond to piles P in a descending order of priorities set as described above. Methods of response may include spraying water, breaking down a pile P to dissipate heat, and performing discharge (processing of a next step). Note that, even with respect to piles P in a same yard Y, a plurality of responses may be combined such as spraying a given pile P with water while discharging another pile P.

When the management system 1 includes a water spraying unit 5 to be described later, the determining unit 23 preferably determines a necessity of water spraying for each pile based on a result of determination of heat generation of the piles.

When the management system 1 includes a pile breakdown unit (not illustrated) to be described later, the determining unit 23 preferably determines a necessity of breaking down a pile P to dissipate heat for each pile P based on a result of determination of heat generation of the piles.

When the management system 1 includes a pile discharge apparatus (not illustrated) to be described later, the determining unit 23 preferably determines a priority of piles P to be discharged based on a result of determination of heat generation of the piles P.

When the management system 1 includes the water spraying unit 5, the pile breakdown unit, and the pile discharge apparatus to be described later in plurality (including cases where each unit is present in plurality), the determining unit 23 preferably determines, for each pile P, a necessity of processing and a priority of the processing in each of the units.

When the management system 1 includes the weather information acquiring unit 24 to be described later, the determining unit 23 may determine heat generation of a pile P using weather information acquired by the weather information acquiring unit 24.

In the case of using air temperature as the weather information, for example, when the air temperature is low, since a pile P is more readily cooled and heat generation is less likely to occur, correction is performed so as to reduce the possibility of heat generation of the pile P. On the other hand, for example, when the air temperature is high, since even heat due to solar radiation is absorbed and heat generation is more likely to occur, correction is performed so as to increase the possibility of heat generation of the pile P.

In the case of using precipitation as the weather information, for example, when precipitation is high, since a pile P is more readily cooled due to rain and heat generation is less likely to occur, correction is performed so as to reduce the possibility of heat generation of the pile P. On the other hand, for example, when precipitation is low, since cooling due to rain does not occur, correction is not performed.

In the case of using wind speed as the weather information, since wind speed hardly affects heat generation of the pile P when the wind speed is low, correction is not performed. In addition, for example, when wind speed is high to a certain degree, since supply of oxygen to the pile P increases, correction is performed so as to increase the possibility of heat generation of the pile P. Furthermore, for example, when wind speed is excessively high, since heat generation of the pile P is cooled due to wind temperature, correction is performed so as to reduce the possibility of heat generation of the pile P.

In addition, when the management system 1 includes the moisture content information acquiring unit 25 to be described later, the determining unit 23 may determine heat generation of a pile P using moisture content information acquired by the moisture content information acquiring unit 25.

Since heat generation is less likely to occur when the moisture content of a pile P of coal and/or steelmaking dust is high, for example, correction is performed so as to reduce the possibility of heat generation of the pile P. Although details will be provided later, the moisture content used in this case is not particularly limited and any of a moisture content of a surface layer of the pile P, an overall mean of the moisture content of the pile P, and a moisture content of a partial sample of the pile P may be used.

[Weather Information Acquiring Unit]

The weather information acquiring unit 24 is configured to acquire weather information indicating current meteorological phenomena and meteorological phenomena forecasted for the future in the yard Y.

Note that "current" refers to a time point of a start of determination by the determining unit 23 and "future" refers to a time after "current".

As the weather information, although not particularly limited, one or two or more of precipitation, air temperature, a wind direction, a wind speed, humidity, and the like can be used. In particular, precipitation is preferably used as weather information. These pieces of weather information can be obtained from meteorological agencies of various countries such as Japan Meteorological Agency or from weather forecasting companies.

Usually, the yard Y in which the piles P are installed has an extensive area and, for example, weather information such as a wind speed may differ from one end to an end on an opposite side of the yard Y. In consideration thereof, the weather information acquiring unit 24 may acquire weather information for each pile P.

[Moisture Content Information Acquiring Unit]

The moisture content information acquiring unit 25 is configured to acquire moisture content information indicating a moisture content contained in coal and/or steelmaking dust.

The moisture content information is not particularly limited and any of a moisture content of a surface layer of the pile P, an overall mean of the moisture content of the pile P, and a moisture content of a partial sample of the pile P may be used. However, by providing the imaging unit with a sensor capable of measuring moisture content information in addition to heat distribution image information of a surface layer of the pile P described above, information can be collectively obtained with the heat distribution image information. When such a sensor is provided, a moisture content of the surface layer of the pile P is to be used.

A method of measuring a moisture content of coal and/or steelmaking dust is not particularly limited and, for example, the moisture content can be measured by a moisture meter adopting a microwave system, an infrared system, or the like, a thermogravimeter, a dry weight system, and the like.

The moisture content information of the pile P often differs depending on the pile P as described above. Therefore, the moisture content information acquiring unit 25 preferably acquires the moisture content information for each pile P.

[Imaging Unit]

An imaging unit 3 is configured to perform imaging of heat distribution image information indicating a heat distribution image of a surface layer of a pile of coal and/or steelmaking dust from a position where imaging of an entire surface layer of the pile can be performed.

Specifically, an example of the imaging unit 3 is an apparatus which performs imaging by mounting an imaging apparatus on a flying object such as a drone capable of flying at positions which enable imaging of an entire surface layer of a pile of the coal and/or steelmaking dust to be performed or a boom such as a reclaimer capable of extending to a height which is higher than the maximum height of the pile P. In addition, the imaging unit 3 preferably includes a heat distribution meter.

In this case, there are piles P of coal and/or steelmaking dust of which height exceeds 10 m. Therefore, a position which enables imaging of an entire surface layer of a pile P of the coal and/or steelmaking dust to be performed is a position sufficiently higher than the height of the pile P. While a position of the imaging unit 3 is not particularly limited, for example, the position of the imaging unit 3 is preferably a position higher than the yard Y by 20 m or more and 200 m or less. Specifically, the position of the imaging unit 3 may be, for example, 25 m or more, 30 m or more, 35 m or more, 40 m or more, 45 m or more, 50 m or more, 55 m or more, 60 m or more, 65 m or more, 70 m or more, 75 m or more, 80 m or more, 85 m or more, 90 m or more, 95 m or more, 100 m or more, 105 m or more, 110 m or more, 115 m or more, 120 m or more, 125 m or more, 130 m or more, or 135 m or more and may be 195 m or less, 190 m or less, 185 m or less, 180 m or less, 175 m or less, 170 m or less, 165 m or less, or 160 m or less.

The imaging unit 3 may be provided with a sensor which measures a moisture content of a surface layer of a pile P to measure moisture content information together with heat distribution image information and the moisture content information acquiring unit 25 may be caused to acquire the moisture content information.

Heat distribution image information and moisture content information measured by the imaging unit 3 may be transmitted to the heat distribution image information acquiring unit 21 or the moisture content information acquiring unit 25 by communicating therewith or may be recorded in a recording medium connected to the imaging unit 3, and then acquired by the heat distribution image information acquiring unit 21 and the moisture content information acquiring unit 25 via the recording medium.

[Output Unit]

An output unit 4 is configured to display, for each pile, a determination result of heat generation of the pile by the determining unit.

For example, when a threshold acquired by the threshold information acquiring unit 22 is set to only 50° C., the output unit 4 may display a location at which a temperature lower than 50° C. is detected in green (meaning "safe") and display a location at which a temperature equal to or higher than 50° C. is detected in red (meaning "danger"). In addition, when the threshold is set to 40° C. and 50° C., the output unit 4 may display a location at which a temperature lower than 40° C. is detected in green (meaning "safe"), display a location at which a temperature equal to or higher than 40° C. and lower than 50° C. is detected in yellow (meaning "caution"), and display a location at which a temperature equal to or higher than 50° C. is detected in red (meaning "danger").

In addition, the output unit 4 may determine whether or not a highest temperature of the pile P exceeds a threshold of a temperature or whether or not the highest temperature equals or exceeds the threshold. For example, when the threshold is set to only 50° C., the output unit 4 may display a pile P in which temperatures of all locations of a surface layer of the pile P are lower than 50° C. in green (meaning "safe") and display a pile P having a location at which the temperature is equal to or higher than 50° C. in red (meaning "danger"). In addition, when the threshold is set to 40° C. and 50° C., the output unit 4 may display a pile P in which temperatures of all locations of a surface layer of the pile P are lower than 40° C. in green (meaning "safe"), display a pile P in which a temperature of a location of a surface layer of the pile P is equal to or higher than 40° C. but temperatures of all locations of the surface layer of the pile P are lower than 50° C. in yellow (meaning "caution"), and display a pile P having a location where the temperature is equal to or higher than 50° C. in red (meaning "danger").

Figure 3:
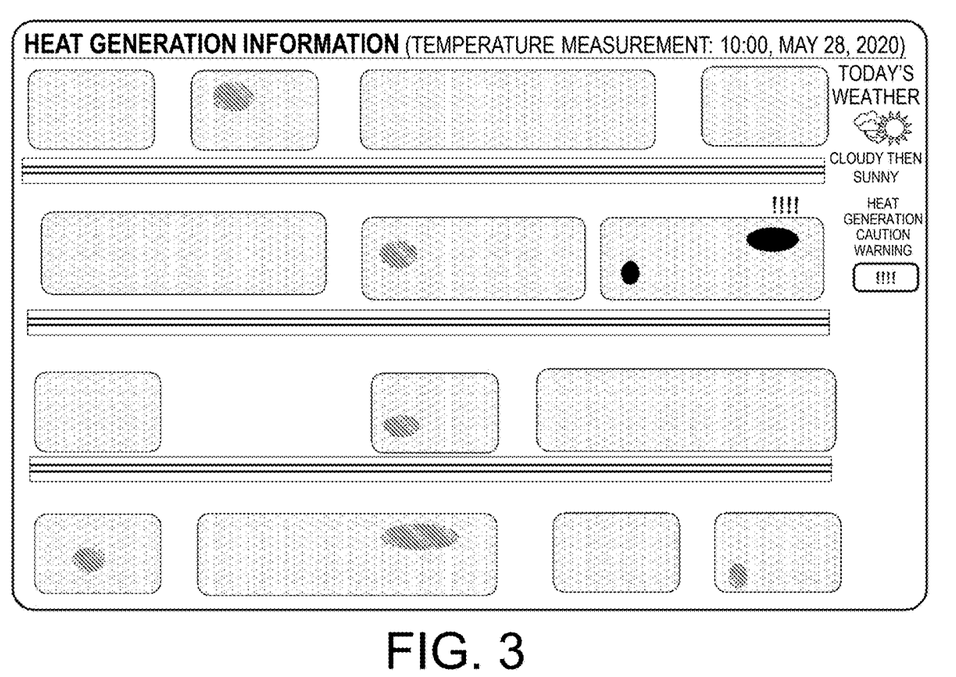
FIG. 3 represents an example of a screen output to an output apparatus according to the present embodiment.

Hereinafter, an example of an output by the management system according to the present embodiment will be described. FIG. 3 represents an example of a screen output to the output apparatus 4 according to the present embodiment. The output screen shows a temperature distribution of an image of a plan view of an entire yard as viewed from above by providing two thresholds and three temperature bands and by coloring the temperature bands in different colors. Specifically, the output screen is provided with the three temperature bands of lower than 40° C. (safe), equal to or higher than 40° C. and lower than 50° C. (caution), and equal to or higher than 50° C. (danger), and the temperature bands are colored in dark tints in an order from former to latter or, in other words, the higher the heat generation temperature, the darker the tint. In addition, on the output screen, a pile having a location where the temperature is equal to or higher than 50° C. is displayed with a "!!!!" mark.

Note that today's weather is shown on a right side of the output screen. The output screen may or may not show today's weather in this manner. Furthermore, information other than today's weather may or may not be shown.

As described above, by displaying temperatures of an entire pile P and an entire yard Y on a single screen so that an occurrence of heat generation is visually recognizable, an operator or the like can quickly come up with a response and, at the same time, overlooking of problems can be suppressed.

[Water Spraying Unit]

The water spraying unit 5 is configured to spray water based on a result of determination of a necessity of water spraying by the determining unit 23.

While the water spraying unit 5 is not particularly limited as long as water can be sprayed on a pile P, for example, a mobile sprinkler truck or a water spray pipe provided at a base or the like of the pile P can be used.

[Pile Breakdown Unit]

Although not illustrated, for each pile P, the pile breakdown unit is configured to break down the pile P to promote heat dissipation of the pile P based on a result of determination of a necessity of pile breakdown by the determining unit 23.

By breaking down and flattening the pile P, the pile breakdown unit brings latent heat inside the pile P into contact with outside air to dissipate heat.

Although the pile breakdown unit is not particularly limited, for example, an excavator or a backhoe can be used.

[Pile Discharging Unit]

Although not illustrated, the pile discharging unit is configured to discharge a pile P based on a result of determination of a priority of piles P to be discharged by the determining unit 23.

Specifically, for example, with respect to piles P ranked in a descending order of possibilities of heat generation by the determining unit 23, the pile discharging unit discharges the piles P in the order.

Note that the coal and/or steelmaking dust in the piles P discharged in this manner is supplied to a next step.

With the management system 1 according to the present embodiment, a heat distribution of an entire surface layer of a pile P of coal and/or steelmaking dust can be readily obtained by performing imaging of heat distribution image information indicating a heat distribution image of the surface layer of the pile P from a position where imaging of the entire surface layer of the pile P can be performed, and such an image enables a risk of heat generation to be readily visually perceived. Furthermore, such a heat distribution enables heat generation to be detected without omission of temperature measurements.

[Hardware Configuration of Management System]

Figure 4:
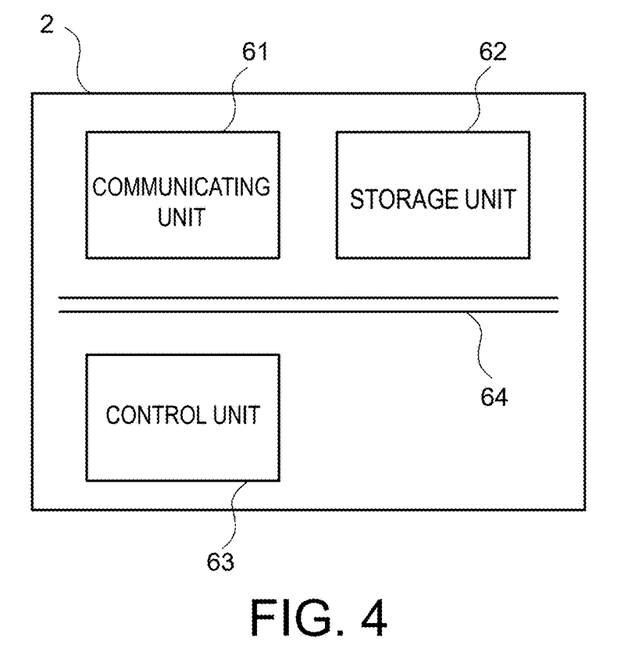
FIG. 4 is a schematic view showing a hardware configuration of the management apparatus according to the present embodiment.

FIG. 4 is a schematic view showing a hardware configuration of the management apparatus 2 according to the present embodiment. As shown in FIG. 4, the management apparatus 2 includes a communicating unit 61, a storage unit 62, and a control unit 63, and these constituent elements are electrically connected via a communication bus 64 inside the management apparatus 2. Hereinafter, the constituent elements will be further described.

While the communicating unit 61 is preferably wired communication means such as USB, IEEE 1394, Thunderbolt, and wired LAN network communication, the communicating unit 61 can include wireless LAN network communication, mobile communication such as 3G/LTE/5G, Bluetooth (registered trademark) communication, and the like when necessary. In other words, more preferably, the communicating unit 61 is implemented as an assembly of the plurality of communication means described above. Accordingly, exchange of information and commands is executed between the management apparatus 2 and other devices capable of communicating with the management apparatus 2.

The storage unit 62 stores various information defined according to the description provided above. The storage unit 62 can be implemented as, for example, a storage device such as a solid state drive (SSD) or a memory such as a random access memory (RAM) which stores information (arguments, arrays, and the like) temporarily necessary in relation to operation of a program. In addition, the storage unit 62 may be a combination thereof. Furthermore, the storage unit 62 stores various programs which can be read by the control unit 63 to be described later.

The control unit 63 performs processing and control of overall operations related to the management apparatus 2. The control unit 63 is, for example, a central processing unit (CPU, not illustrated). The control unit 63 realizes various functions related to the management apparatus 2 by reading a predetermined program stored in the storage unit 62. In other words, by causing information processing by software (stored in the storage unit 62) to be concretely realized by hardware (the control unit 63), the information processing can be executed as respective functional units in the control unit 63 as shown in FIG. 4. While a single control unit 63 is notated in FIG. 4, the reality is not limited thereto and a configuration may be adopted in which a plurality of control units 63 are provided for each function or a single control unit and a plurality of control units may be combined with each other.

<Management Method>

A management method according to the present embodiment is a management method of coal and/or steelmaking dust being managed outdoors and the management method includes an imaging step, a threshold information acquisition step, and a determination step. The imaging step is a step of performing imaging of heat distribution image information indicating a heat distribution image of a surface layer of a pile of the coal and/or steelmaking dust from a position where imaging of an entirety of the pile can be performed. In addition, the threshold information acquisition step is a step of acquiring threshold information indicating a threshold of a temperature of the surface layer of the pile. Furthermore, the determination step is a step of determining heat generation of the pile based on the heat distribution image information and the threshold information.

Figure 5:
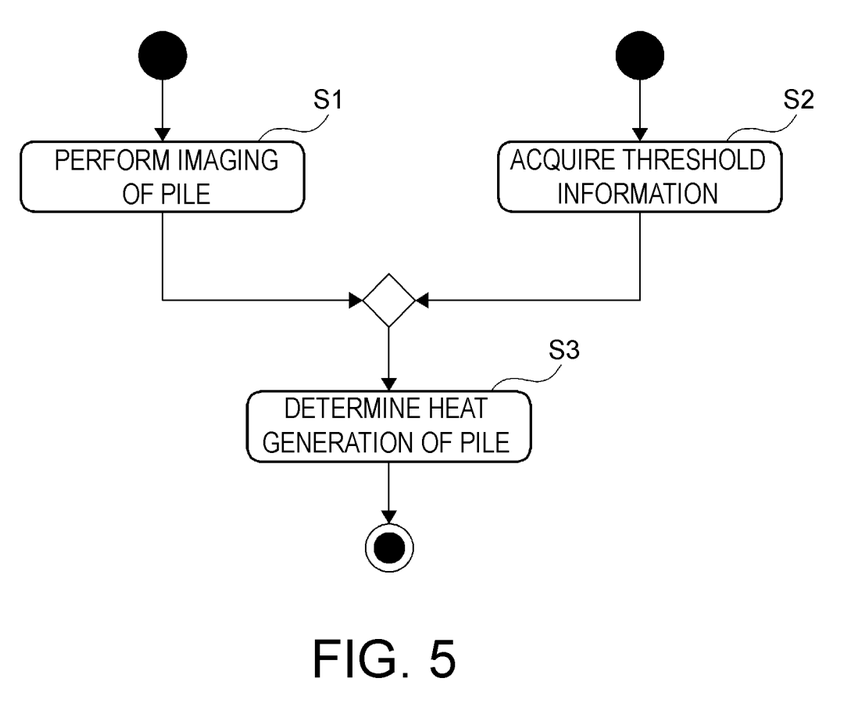
FIG. 5 is a flowchart of a management method according to the present embodiment.

FIG. 5 is a flowchart of the management method according to the present embodiment. As shown in FIG. 5, in the management method according to the present embodiment, imaging of a pile P is performed (imaging step S1), threshold information is acquired (threshold information acquisition step S2), and with the image of the pile P and the threshold information as input information, heat generation of the pile P is determined (determination step S3). In this case, a precedence of order of the imaging step S1 and the threshold information acquisition step S2 does not matter and the imaging step S1 may be performed first, the threshold information acquisition step S2 may be performed first, or the imaging step S1 and the threshold information acquisition step S2 may be performed at the same time.

Note that the management method according to the present embodiment may be provided with a weather information acquisition step, a moisture content information acquisition step, an imaging step, an output step, a water spraying step, a pile breakdown step, and a pile discharge step. Since these steps are respectively similar to operations of the weather information acquiring unit, the moisture content information acquiring unit, the imaging unit, the output unit, the water spraying unit, the pile breakdown unit, and the pile discharging unit, descriptions thereof will be omitted here.

<Management Program>

A management program according to the present embodiment is a management program of coal and/or steelmaking dust being managed outdoors and the management program causes a computer to function as a heat distribution image information acquiring unit, a threshold information acquiring unit, and a determining unit. Since the heat distribution image information acquiring unit, the threshold information acquiring unit, and the determining unit have been described above, descriptions thereof will be omitted here.

The present invention is not limited whatsoever to the embodiment described above and can be implemented with appropriate modifications.

What is claimed is:

1. A management system of coal and/or steelmaking dust being managed outdoors, the management system comprising:
a processor configured to:
acquire a heat distribution image information indicating a heat distribution image of a surface layer of a pile of the coal and/or steelmaking dust, imaging of the heat distribution image having been performed from a position where imaging of an entire surface layer of the pile can be performed,
acquire threshold information indicating a threshold of a temperature of the surface layer of the pile,
determine heat generation of the pile based on the heat distribution image information and the threshold information,
determine a necessity of response to each pile based on a result of determination of heat generation of the pile, and
allow the response to be provided based on the determination of a necessity of response.

2. The management system according to claim 1, wherein the processor is further configured to:
display, for each pile, a determination result of heat generation of the pile.

3. The management system according to claim 1, wherein the imaging of the heat distribution image is performed by flying object including a heat distribution meter.

4. The management system according to claim 1, wherein the processor is further configured to:

determine a necessity of water spraying for each pile based on a result of determination of heat generation of the pile, and allow a water spraying unit to spray water based on a result of determination of a necessity of water spraying as the response to be provided.

5. A management apparatus of coal and/or steelmaking dust being managed outdoors, the management apparatus comprising:

a processor configured to:

acquire a heat distribution image information which indicates a heat distribution image of a surface layer of a pile of the coal and/or steelmaking dust, imaging of the heat distribution image having been performed from a position where imaging of an entire surface layer of the pile can be performed, acquire threshold information indicating a threshold of a temperature of the surface layer of the pile, determine heat generation of the pile based on the heat distribution image information and the threshold information, determine a necessity of response to each pile based on a result of determination of heat generation of the pile, and allow the response to be provided based on the determination of a necessity of response.

6. A management method of coal and/or steelmaking dust being managed outdoors, the management method comprising:

acquiring a heat distribution image information indicating a heat distribution image of a surface layer of a pile of the coal and/or steelmaking dust from a position where imaging of an entirety of the pile can be performed, acquiring threshold information indicating a threshold of a temperature of the surface layer of the pile, determining heat generation of the pile based on the heat distribution image information and the threshold information, determining a necessity of response to each pile based on a result of determination of heat generation of the pile, and allowing the response to be provided based on the determination of a necessity of response.

7. A non-transitory computer readable media storing a management program of coal and/or steelmaking dust being managed outdoors, the management program causing a computer to acquire a heat distribution image information indicating a heat distribution image of a surface layer of a pile of the coal and/or steelmaking dust, imaging of the heat distribution image having been performed from a position where imaging of an entire surface layer of the pile can be performed, acquire threshold information indicating a threshold of a temperature of the surface layer of the pile, determine heat generation of the pile based on the heat distribution image information and the threshold information, determine a necessity of response to each pile based on a result of determination of heat generation of the pile, and allow the response to be provided based on the determination of a necessity of response.

* * * * *